(12) United States Patent  
Marchetta et al.

(10) Patent No.: US 11,420,704 B2  
(45) Date of Patent: Aug. 23, 2022

(54) STEERING GROUP OF A MOTOR VEHICLE AND MOTOR VEHICLE THEREOF

(71) Applicant: PIAGGIO & C. S.p.A., Pisa (IT)

(72) Inventors: Francesco Marchetta, Pisa (IT); Luca Balduino, Pisa (IT); Daniele Torriani, Pisa (IT)

(73) Assignee: PIAGGIO & C. S.P.A., Pontedera (IT)

( * ) Notice: Subject to any disclaimer, the term of this patent is extended or adjusted under 35 U.S.C. 154(b) by 798 days.

(21) Appl. No.: 16/330,582

(22) PCT Filed: Sep. 5, 2017

(86) PCT No.: PCT/IB2017/055318  
§ 371 (c)(1),  
(2) Date: Mar. 5, 2019

(87) PCT Pub. No.: WO2018/047055  
PCT Pub. Date: Mar. 15, 2018

(65) Prior Publication Data  
US 2021/0276656 A1 Sep. 9, 2021

(30) Foreign Application Priority Data  
Sep. 6, 2016 (IT) .......................... 102016000090140

(51) Int. Cl.  
*B62K 21/10* (2006.01)  
*B62K 19/32* (2006.01)  
*B62K 21/08* (2006.01)

(52) U.S. Cl.  
CPC .............. *B62K 21/10* (2013.01); *B62K 19/32* (2013.01); *B62K 21/08* (2013.01)

(58) Field of Classification Search  
CPC ................................ B62K 21/08; B62K 21/10  
See application file for complete search history.

(56) References Cited

U.S. PATENT DOCUMENTS 364,335 A 6/1887 Burdess  
3,990,716 A 11/1976 Dows  
(Continued)

FOREIGN PATENT DOCUMENTS

CH 650742 A5 8/1985  
DE 202005004085 U1 5/2005  
(Continued)

OTHER PUBLICATIONS

International Search Report for corresponding application PCT/IB2017/055318 filed Sep. 5, 2017; dated Jan. 12, 2018.  
(Continued)

*Primary Examiner* — Minnah L Seoh  
*Assistant Examiner* — Harold Eric Pahlck, III  
(74) *Attorney, Agent, or Firm* — Cantor Colburn LLP (57) ABSTRACT

Steering group of a motor vehicle including a front frame provided with a steering tube that rotatably houses a steering shaft or pin, which rotates about a steering axis, the front frame being provided with an upright integral with the steering tube, the front frame having a steering bracket (36), integral in rotation with the steering shaft where, the steering group includes elastic return means which elastically influence the steering shaft to position itself symmetrically with respect to the front frame, the elastic return means being interposed between the upright and the steering bracket so as to be compressed when the steering shaft rotates with respect to the central symmetrical position, wherein the elastic return means have a regressive trend elastic response.

26 Claims, 7 Drawing Sheets

(56) References Cited

U.S. PATENT DOCUMENTS

| | | | | |
|---|---|---|---|---|
| 8,439,380 B2* | 5/2013 | Mori | ...................... | B62K 21/08 |
| | | | | 280/271 |
| 9,598,138 B2* | 3/2017 | Watanabe | .............. | B62K 21/08 |
| 9,932,064 B1* | 4/2018 | Dyar | ...................... | B62K 21/02 |
| 2004/0239069 A1 | 12/2004 | Yamada | | |
| 2005/0236791 A1 | 10/2005 | Carr | | |
| 2007/0176392 A1* | 8/2007 | Schiffer | .................. | F16F 9/532 |
| | | | | 280/272 |
| 2011/0175321 A1* | 7/2011 | Kuboyama | ............ | B62K 21/08 |
| | | | | 280/286 |

FOREIGN PATENT DOCUMENTS

| | | | |
|---|---|---|---|
| EP | 1783023 | A1 | 5/2007 |
| FR | 779221 | | 1/1935 |
| GB | 308935 | | 4/1929 |
| JP | 47038946 | B | 10/1972 |
| JP | 5032900 | | 3/1975 |
| JP | 50127156 | | 12/1976 |
| JP | 2001035129 | A | 2/2001 |
| JP | 200776634 | A | 3/2007 |
| JP | 2013104438 | A | 5/2013 |
| WO | 2016166643 | A1 | 10/2016 |

OTHER PUBLICATIONS

Chinese Search Report for corresponding application 2017800650497 filed Sep. 5, 2017; Report dated Mar. 16, 2020.

Taiwanese Search Report for Patent Application No. 106130425 filed Sep. 6, 2017: Report dated Jun. 10, 2020.

\* cited by examiner

# STEERING GROUP OF A MOTOR VEHICLE AND MOTOR VEHICLE THEREOF

SCOPE

This invention relates to a steering group of a motor vehicle and the related motor vehicle comprising said steering group.

STATE OF THE ART

As is known, the front axle of a motor vehicle comprises a steering group connected to the front steering wheel of the motor vehicle.

During use, especially at low speeds, the steering of a motor vehicle may tend to lock, i.e. impose a steering angle greater than the one set by the user via the handlebar.

The causes of this dynamic behavior of the front axle are essentially related to the fact that the front wheel rotates about a steering axis that has a certain angle of inclination relative to the vertical to the ground. This angle of inclination, combined with the fact that the steering axis does not pass through the pin of the front wheel, but is usually set back with respect to the wheel pin, in the opposite direction to the direction of travel, confers to the front wheel the so-called 'trail'. 'Trail' means the distance between the projection on the ground of the perpendicular passing through the center of rotation of the wheel and the steering axis of the wheel. The steering axis is usually the rotation axis of a fork, arranged astride the wheel, which supports the latter on opposite sides. Obviously, the same considerations apply to single-arm fork solutions in which the wheel is rotatably supported cantilevered with respect to a single arm.

The greater the trail, the more marked is the phenomenon.

Furthermore, for the same steering geometry, increasing the diameter of the rim, and therefore the overall diameter of the wheel, also increases the trail.

In addition, any vertical loads imposed on the front wheel, for example in the case of front fairings and lights fixed on the steering group, and rotatable with it, contribute further to increasing the locking effect of the steering.

PRESENTATION OF THE INVENTION

To solve the cited problems, i.e., to counteract this locking effect of the steering, to date various solutions have been adopted in the known art.

For example, as regards the effect of the vertical weight bearing on the front wheel, it is known to center the weight of the fairing precisely on the steering axis: However, this technique creates considerable aesthetic constraints on the geometry, type and positioning of the fairing itself and the related headlight.

Moreover, it is also known to use suitable steering plates that increase the offset between the fork and the steering axis, which is particularly set back, so as to reduce the trail at the same angle of incidence, i.e., the inclination of the steering axis. However, even this solution imposes constraints in terms of aesthetics as well as the dynamics of the vehicle.

It is also possible to act on the inclination of the steering axis (incidence) by reducing it or even reducing the diameter of the front wheel: obviously, both solutions have new, non-trivial effects on both the aesthetics and dynamics of the vehicle.

It is also known in the art to use lever mechanisms that oppose the steering movement; these mechanisms are bound to the lower steering plate and to the frame so as to load springs during steering; such springs, due to a related arm, exert a moment that opposes the steering. In this way, without changing the dynamic and/or aesthetic parameters of the vehicle, one tries to cancel the locking effect of the steering described above.

The known solutions that provide for such springs and lever systems present new drawbacks.

In fact, it is not easy to calibrate the springs so that the action counteracting the locking effect of the steering is effective and is not annoying for the user. In fact, if 'soft' springs are used, the system is not particularly noticeable or annoying for the user, but, on the other hand, it is only effective for substantial steering angles, since the force exerted by the spring, and therefore the moment on the steering axis, is only sufficient for long strokes of the spring itself. In fact, increasing the steering angle not only increases the force exerted by the spring, which deforms more, but also increases the arm exerted by the spring around the steering axis and thus the moment that counteracts the locking of the steering itself. Therefore, once a threshold value is exceeded, the action of the spring begins to be effective to counteract the locking of the steering while at low steering angles the action of the mechanism is substantially unnoticeable.

On the contrary, if 'stiff' springs are used, the system is very effective at the lower steering angles but, on the other hand, for high steering angles the system is too noticeable for the driver and, at the limit, annoying as it makes the steering excessively hard. In fact, as seen, increasing the steering angle not only increases the force exerted by the spring, which deforms more, but also increases the arm exerted by the spring around the steering axis and thus the moment that counteracts the locking of the steering itself. Therefore, when a threshold value is exceeded, the action of the mechanism is such as to excessively oppose the steering action desired by the user, who feels that the steering is heavy and unwieldy.

With the current solutions of the art, the choice of the stiffness of the spring is a compromise that is never able to fully meet the requirements of users.

Therefore, there is a need to solve the drawbacks and limitations mentioned in reference to the prior art.

This need is met by a steering group of a motor vehicle according to claim 1.

DESCRIPTION OF THE DRAWINGS

Further features and advantages of the present invention will become more understandable from the following description of its preferred and non-limiting examples of embodiment, wherein.

The elements or parts of elements in common between the embodiments described hereinafter will be indicated with the same numerical references.

DETAILED DESCRIPTION

With reference to the aforementioned figures, a total schematic view of a steering group of a motor vehicle 8 is generally indicated at 4.

For the purposes of this invention, it should be clarified that the term 'motor vehicle' must be considered in the broad sense, encompassing any motorcycle having at least two wheels, namely a front wheel 10 and a rear wheel. Therefore, this definition also includes motorcycles having three wheels, for example, motor vehicles that comprise a single steering wheel on the front axle and two drive wheels on the rear axle, as well as motor vehicles having two front steering wheels, possibly tilting, and one rear drive wheel. Also included in this definition are quadricycles having two front steering wheels, possibly tilting, and two rear wheels, regardless of the drive wheel.

The present invention focuses on a front axle 12 of a motor vehicle 8; the rear axle is not described or illustrated. For the purposes of this invention, the rear axle may be of any type. In general, both the rear fork of the motor vehicle and the frame may have any shape and size, and may be, for example, of the lattice or box type, die-cast, etc.

In particular, the steering group 4 of a motor vehicle comprises a front frame 16 fitted with a steering tube 20 rotatably housing a steering shaft or pin 24, which rotates around a steering axis X-X.

The steering tube 20 typically has a cylindrical shape and rotatably supports the steering shaft 24, in turn connected to a handlebar 28 to allow the user to steer. In turn, in a known manner, the steering shaft 24 is kinematically connected with the front wheel 10 or front wheels 10, so as to transmit to the wheel or front wheels 10 the steering movement imposed by the user via the handlebar 28.

The front frame 16 is fitted with an upright 32 integral with said steering tube 20.

The upright 32 may be any mechanical elements of the frame, including the steering tube 20.

The steering tube 20 defines the inclination or incidence of the steering axis X-X, i.e., the angle that the steering axis forms with a vertical direction Z-Z, perpendicular to the ground, on a centerline plane M-M of the front frame 16 directed along a longitudinal direction of travel Y-Y.

Figure 1:
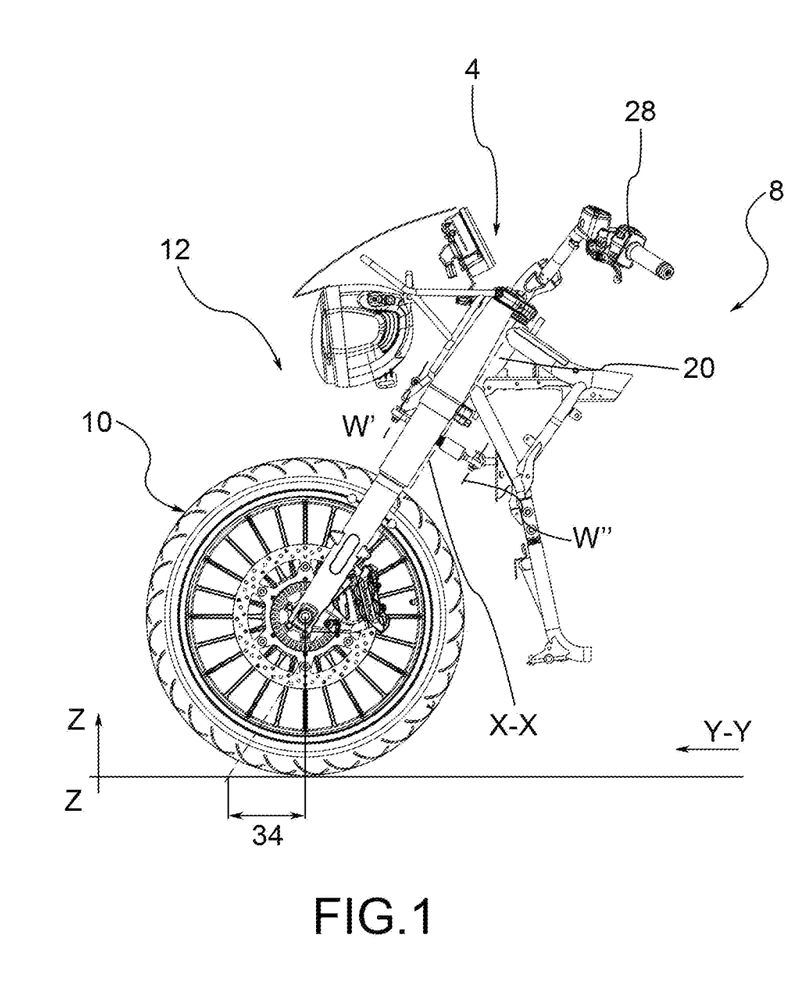
FIG. 1 is a side view of a front axle of a motor vehicle according to an embodiment of the present invention.
Figure 2:
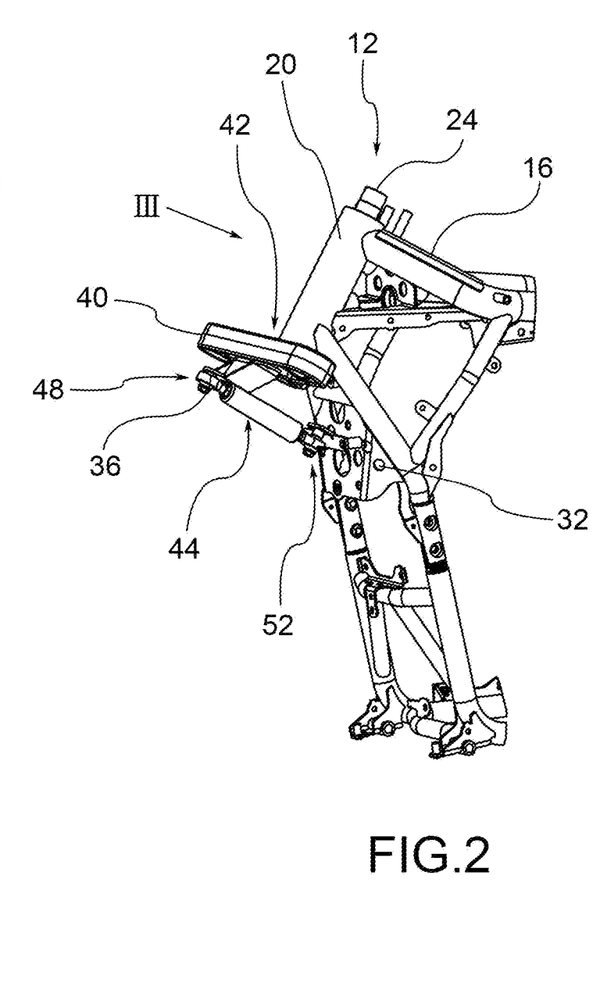
FIG. 2 is a partial perspective view of the motor vehicle front axle of FIG. 1.
Figure 3:
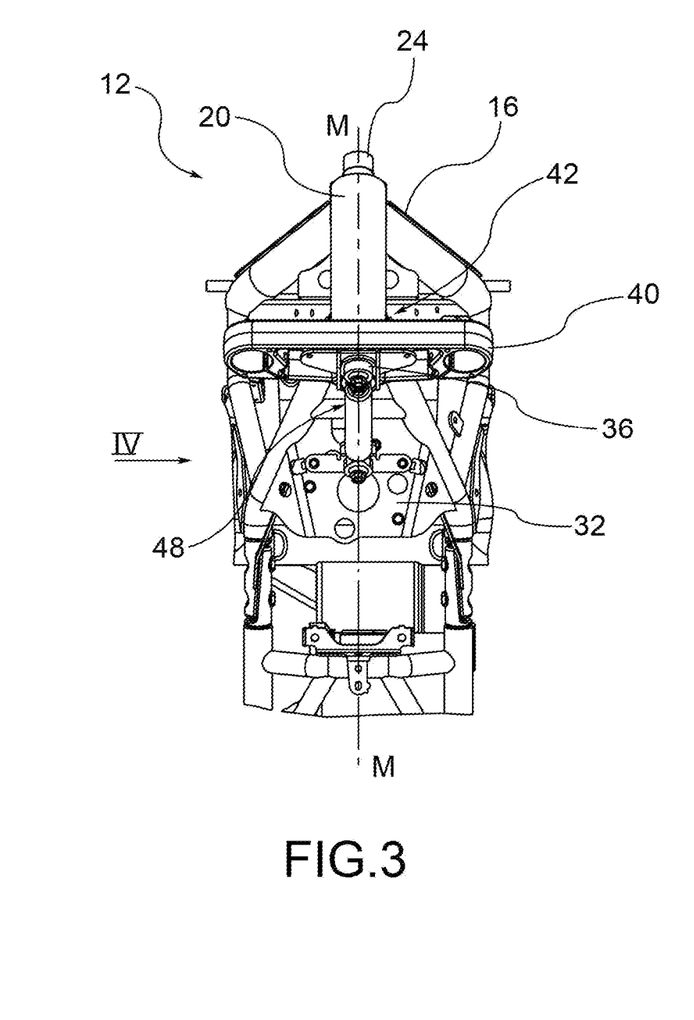
FIG. 3 is a front view of the front axle of FIG. 2, from the side of the arrow III of FIG. 2.
Figure 4:
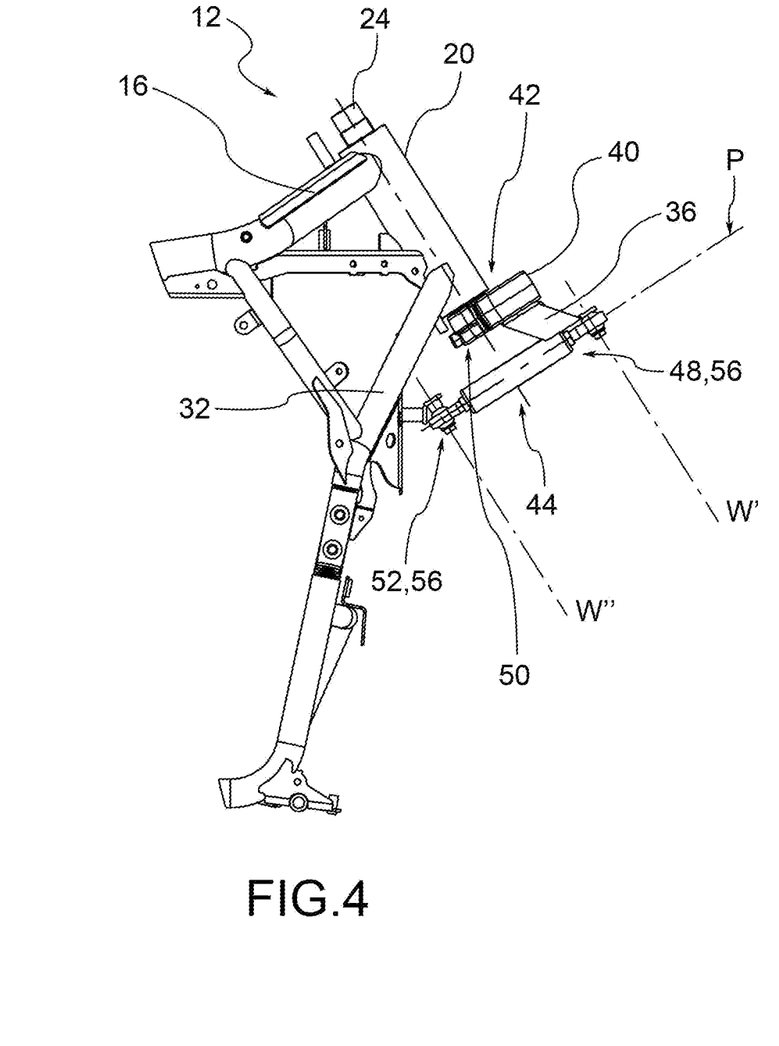
FIG. 4 is a side view of the front axle of FIG. 2, from the side of the arrow IV of FIG. 3.

In FIG. 1 it is also possible to see the trail 34, i.e., the distance between the projection on the ground of the perpendicular passing through the center of rotation of the wheel and the steering axis X-X of the front wheel 10.

The front frame 16 also comprises a steering bracket 36, integral in rotation with the steering shaft 24. 'Steering bracket' 36 means any mechanical element integral in rotation with the steering shaft 24. The steering bracket 36 may have any shape and size and be made of any material.

For example, the steering bracket 36 may be arranged on a lower steering plate 40 associated with a lower end 42 of the steering tube 20, on the side opposite the handlebar 28.

Advantageously, the steering group 4 comprises elastic return means 44 that elastically influence the steering shaft 24 to position itself in a central position symmetrical with respect to the front frame 16.

The elastic return means 44 are placed and mechanically connected between the upright 32 and the steering bracket 36 in order to exert an elastic return action when the steering shaft 24 rotates with respect to said central symmetrical position.

In other words, the elastic return means 44 elastically influence the steering shaft 24 to return to the central symmetrical position whenever the latter is rotated by the user by means of the handlebar 28, with respect to this central symmetrical position.

Advantageously, said elastic return means 44 have a regressive trend elastic response, wherein the stiffness of the elastic return means 44 decreases as the displacement of the steering shaft 24 from said central position increases.

Preferably, said elastic return means 44 have a zero preload, so as not to exert any elastic action around the central symmetrical position of the steering shaft 24.

According to a possible embodiment, the elastic return means 44 are placed between the upright 32 and the steering bracket 36 so as to be pulled when the steering shaft 24 rotates with respect to said central symmetrical position. In such embodiment, the elastic return means 44 have a regressive trend elastic response, wherein the stiffness of the elastic return means 44 decreases as the traction of the return means 44 increases.

According to a further embodiment, the elastic return means 44 are placed between the upright 32 and the steering bracket 36 so as to be compressed when the steering shaft 24 rotates with respect to said central symmetrical position. In this embodiment, said elastic return means 44 have a regressive trend elastic response, wherein the stiffness of the elastic return means 44 decreases as the compression of the return means 44 increases.

Due to the present invention, as the steering angle increases, the steering shaft 24 obtains an elastic reaction force that increases less and less, i.e., in a regressive manner; said elastic reaction force translates into a reaction torque on the steering shaft 24 that counteracts the steering itself. In other words, the stiffness of the elastic return means 44, and therefore the increase of the reaction torque on the steering shaft 24, decreases with the increase of the steering angle.

In this way, the regressiveness of the elastic return means 44 causes said elastic return means to oppose the tendency of the steering to lock, improving the running dynamics and the sensation of stability of the vehicle. Moreover, such regressiveness of the elastic return means 44 means that the steering never becomes too stiff in the case of large steering angles, such as for example in maneuvers of standing still or at low speed. Preferably, a first attachment point 48 of the elastic return means 44 to the steering bracket 36 is positioned in front of the steering axis X-X, in a forward direction of travel with respect to a plane P orthogonal to the steering axis X-X and parallel to a lower surface of said steering bracket 36, and wherein a second attachment point 52 of the elastic return means 44 to the upright 32 is positioned behind the steering axis X-X with respect to said forward direction of travel on the plane P.

In this way, the elastic return means 44 are subjected to an action of compression when the steering shaft 24 is rotated with respect to the central symmetrical position.

The attachment points 48,52 are preferably, but not necessarily, aligned with respect to the centerline plane M-M of the front frame 16, placed parallel to a straight direction of travel, so as to have a symmetrical behavior of the elastic return means 44 in the steering to the right and to the left with respect to the symmetrical central steering position.

According to one embodiment, said attachment points 48,52 of the elastic return means 44 comprise cylindrical joints 56 which allow respective rotations of the elastic return means 44 around the rotation axes W' and W" parallel to said steering axis X-X.

Figure 5:
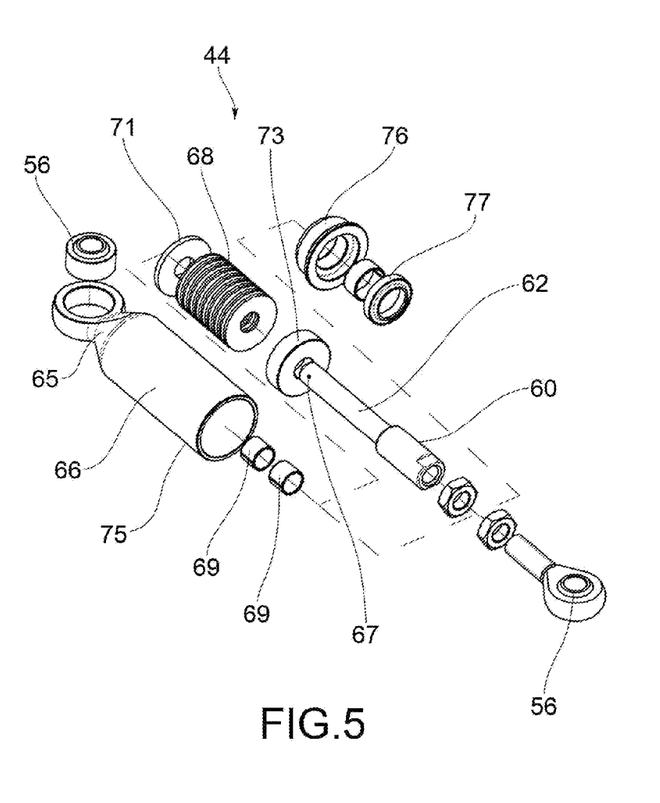
FIG. 5 is a perspective view, in separate parts, of elastic return means of a front axle according to an embodiment of the present invention.
Figures 6, 7:
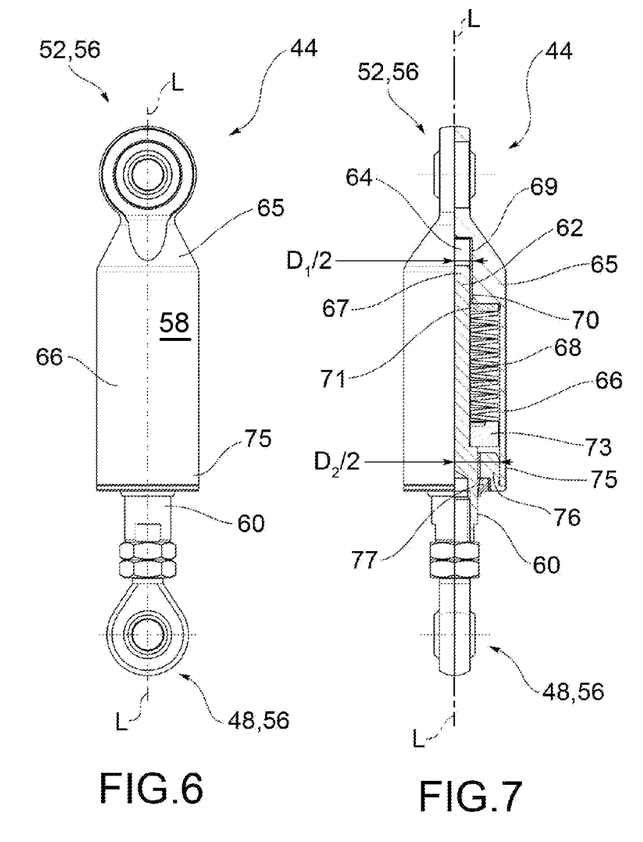
FIGS. 6-7 are respectively a side view and partially sectional view of the elastic return means of FIG. 5, in an assembly configuration.

According to one embodiment, the elastic return means 44 comprise a sheath 58 and a piston 60 provided with a stem 62 sliding with respect to a seat 64 delimited by said sheath 58, the piston 60 and the sheath 58 being each integral with one of said attachment points 48,52 and wherein between the stem 62 and the seat 64 at least one spring 68 is interposed so that the center-to-center distance 72 or the distance between the attachment points 48,52 is variable as a function of the compression of said spring 68.

The sheath 58 creates an outer casing of closure and stiffening for the elastic return means 44.

In particular, the sheath 58 comprises a first cup-shaped portion 65 and a second cup-shaped portion 66 that realize an outer casing of closure and stiffening for the elastic return means 44.

Said cup-shaped portions are axially symmetrical, in particular cylindrical, with respect to a prevalent direction of extension L-L of the elastic return means 44.

This prevalent direction of extension L-L is the direction defined by joining the attachment points 48,52 of the elastic return means 44.

In particular, the diameter D1 of the first cup-shaped portion 65 is smaller than the diameter D2 of the second cup-shaped portion 66; the diameter D1 is sized so as to house an end portion 67 of said stem 62 with clearance; for example, said clearance houses at least one sliding bushing 69 that facilitates the relative sliding between the end portion 67 of the stem 62 and the first cup-shaped portion 65.

At a passage portion between the first and the second cup-shaped portions 65,66 there is a first shoulder 70 which defines a first axial abutment 71 for the spring 68. The first axial abutment 71 may also be composed of a special washer separate from the first shoulder 70 and abutting against the same.

The piston 60 comprises a second shoulder 73, axially opposed to the first shoulder 70.

Said first and second shoulders 70,73 respectively define the end of stroke for the spring 68 along the prevalent direction of extension L-L of the elastic return means 44.

In other words, the distance between said first and second shoulders 70,73 along the prevalent direction of extension L-L of the elastic return means 44 always defines the axial length of the spring 68.

The second cup-shaped portion 66 terminates with a locking end 75 that is inserted in a closing cap 76 on the side of the first attachment point 48 integral with the stem 62.

The second cup-shaped portion 66 houses with clearance the first shoulder 70, the second shoulder 73 and the spring 68, but locks on the closing cap 76.

The closing cap 76 houses the stem 62 with clearance so as to allow the sliding of the stem 62 with respect to the same closing cap.

The closing cap 76 is provided with a dust cover or seal 77 that slides on the stem 62 so as to prevent the entry of dust and dirt inside the sheath 58.

In this way, the movement of approaching and separating between the first and second attachment points 48,52 is guided both from the inside, dynamically, by the coupling with clearance between the end portion 67 and the seat 64, and externally by the second cup-shaped portion 66 which, by stiffening it, contains the moving structure of the elastic return means 44.

The presence of a double guide, internal and external, stiffens the elastic return means 44, preventing, under load, any binding of the stem 62 with respect to the seat 64.

Furthermore, as seen, the first and second cup-shaped portions 65,66 constitute a casing of closure of the elastic return means which prevents dust, stones and dirt from being able to slip inside the spring 68 and in general the moving parts, compromising their operation and/or limiting their sliding capacity.

For example, the spring 68 is arranged coaxially to the stem 62 of the piston 60.

Preferably, the elastic return means 44 comprise at least one regressive spring 68 as a function of the compression.

Figure 8:
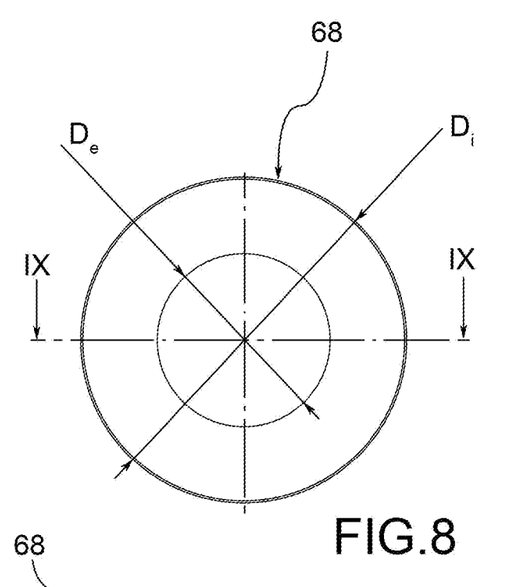
FIG. 8 is a plan view of a Belleville spring.
Figure 9A:
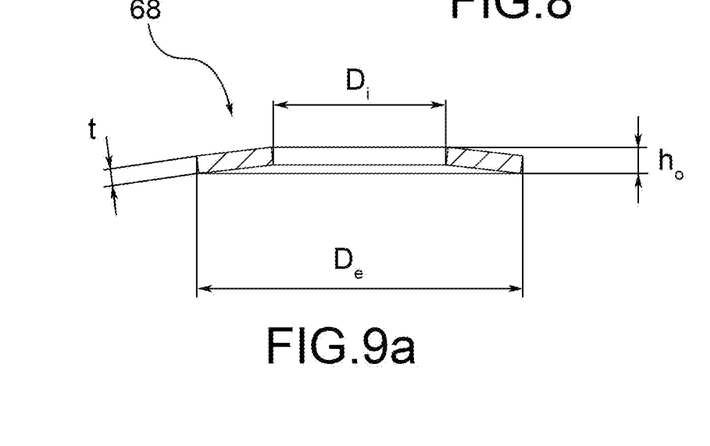
FIG. 9a is a sectional view of the Belleville spring of FIG. 8 along the section line IX-IX of FIG. 8.

According to one embodiment, said at least one spring 68 is a Belleville spring.

Preferably, the elastic return means 44 comprise a plurality of regressive trend Belleville springs 68, positioned in series.

Preferably, said Belleville springs 68 in series are arranged in direct contact with each other.

For example, said Belleville springs 68 are envisaged in a number between 10 and 40, in series with each other; preferably, said Belleville springs 68 are envisaged in a number between 15 and 30, in series with each other.

Preferably, the Belleville springs 68 are equal to each other.

As regards the arrangement of the Belleville springs in series, it is necessary to calculate the equivalent stiffness Keq and the stroke x required of the series of springs, so as to obtain the law that defines the elastic force provided by the series of springs.

Placing the Belleville springs in series, one obtains:

$$\frac{1}{k_{eq}} = \sum_{i=1}^{N} \frac{1}{k_i}$$

$$x = \sum_{i=1}^{N} x_i$$

$$F = k_{eq} * x$$

In particular, placing N equal Belleville springs in series, one obtains:

$$k_{eq} = \frac{1}{N * \frac{1}{k_i}}$$

$$x_i = \frac{x}{N}$$

Figure 10:
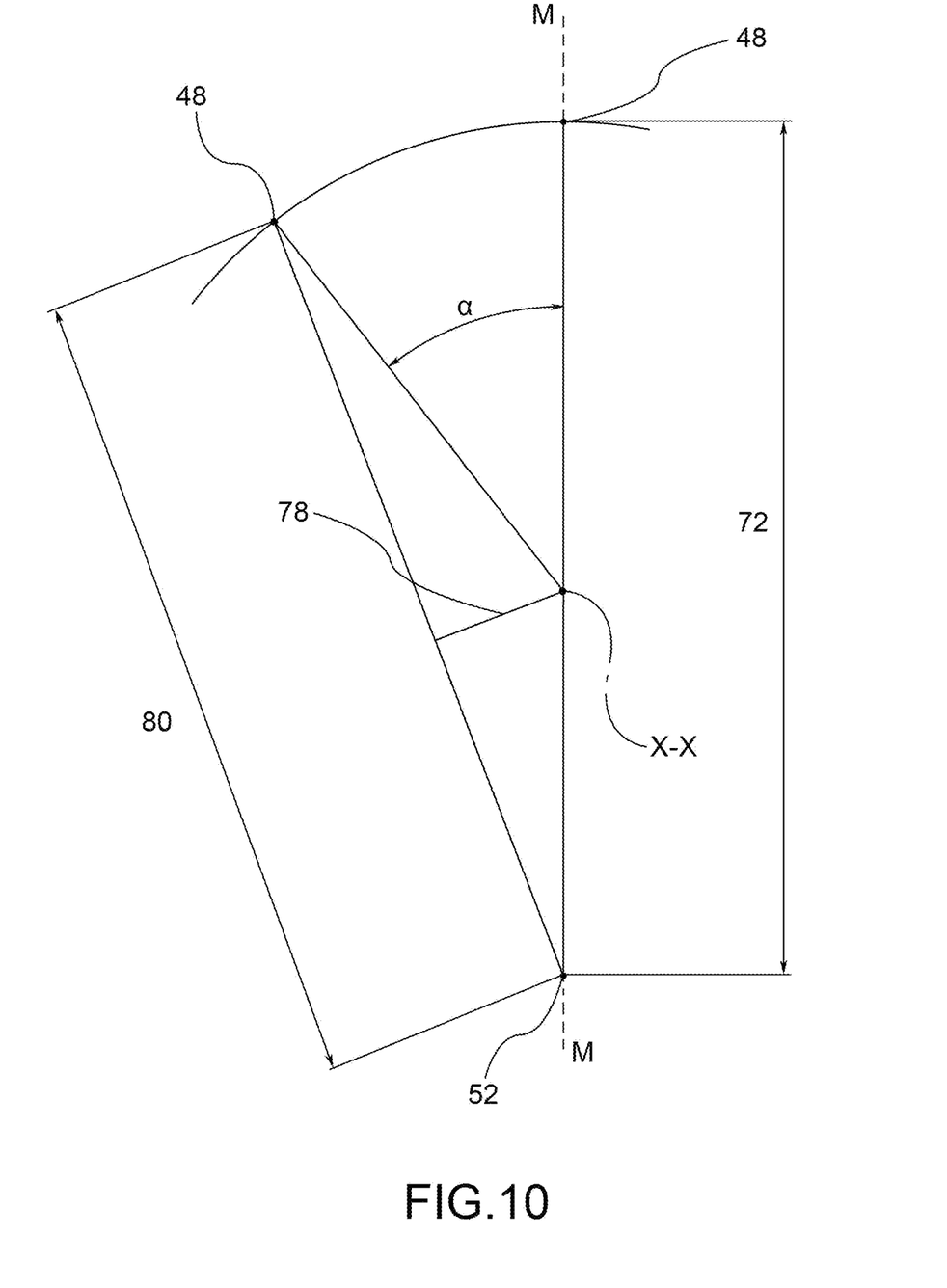
FIG. 10 is a schematic view of a kinematic mechanism provided with elastic return means according to the present invention.

The single Belleville spring has a regressive behavior: the stiffness decreases as the stroke of the single spring increases. Consequently, also the equivalent stiffness will decrease with the increase of the total stroke of the system of springs in series. In particular, the total stroke is calculated with the following equation:

X=initial interaxial spacing−(interaxial spacing)∝ where ∝ is the i-th steering angle (see diagram of FIG. 10).

Initial interaxial spacing therefore means the initial distance between the attachment points 48,52 of the elastic return means 44 when the steering shaft 24 is in the central symmetrical position; in other words, the initial interaxial spacing is substantially equal to the length at rest of the elastic return means.

While the (interaxial spacing)∝ is the interaxial spacing, i.e., the distance between said attachment points 48,52 of the elastic returns means 44 when the steering shaft 24 is rotated in the generic position ∝.

According to one embodiment, the Belleville springs (68) are sized so as to have $1.8 < D_e/D_i < 2.4$, where $D_e$ is equal to an outer diameter of the Belleville spring and $D_i$ is equal to an inner diameter of the Belleville spring 68.

According to one embodiment, the Belleville springs 68 are sized so as to have $18 < D_e/t < 28$, where $D_e$ is equal to an outer diameter of the Belleville spring 68 and t is equal to a thickness of the Belleville spring 68.

According to one embodiment, the Belleville springs 68 are sized so as to have $0.4 <; h_0/t <; 0.75$, where $h_0$ is equal to the rest height of the Belleville spring 68 and t is equal to a thickness of the Belleville spring 68.

The operation of a steering group for motorcycles according to the present invention will now be described.

As seen, the fundamental characteristic of the steering group of this invention is given by the presence of springs with regressive behavior.

In particular, the elastic action transmitted to the steering shaft is a steering torque that depends not only on the force transmitted by the spring, on its function of the stroke between the attachment points 48,52, but also on the arm 78 of such force with respect to the steering axis X-X.

Figure 12:
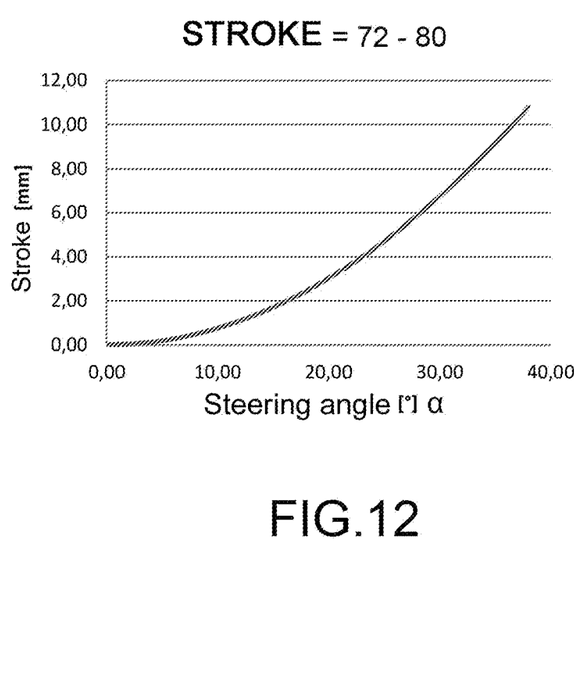
FIG. 12 consists of a graph depicting the trend of a stroke of the elastic return means as a function of a steering angle, according to an embodiment of the present invention.

FIG. 12 shows the trend of the stroke between the attachment points 48,52 (on the ordinate) as a function of the steering angle imposed by the user (on the abscissa).

Substantially the stroke between the attachment points 48,52 is equal to the difference between the interaxial spacing 72 (initial, i.e., in the central symmetrical position of the steering shaft 24) and the final interaxial spacing 80, as a result of a steering angle ∝ with respect to the central symmetrical position.

Figure 13:
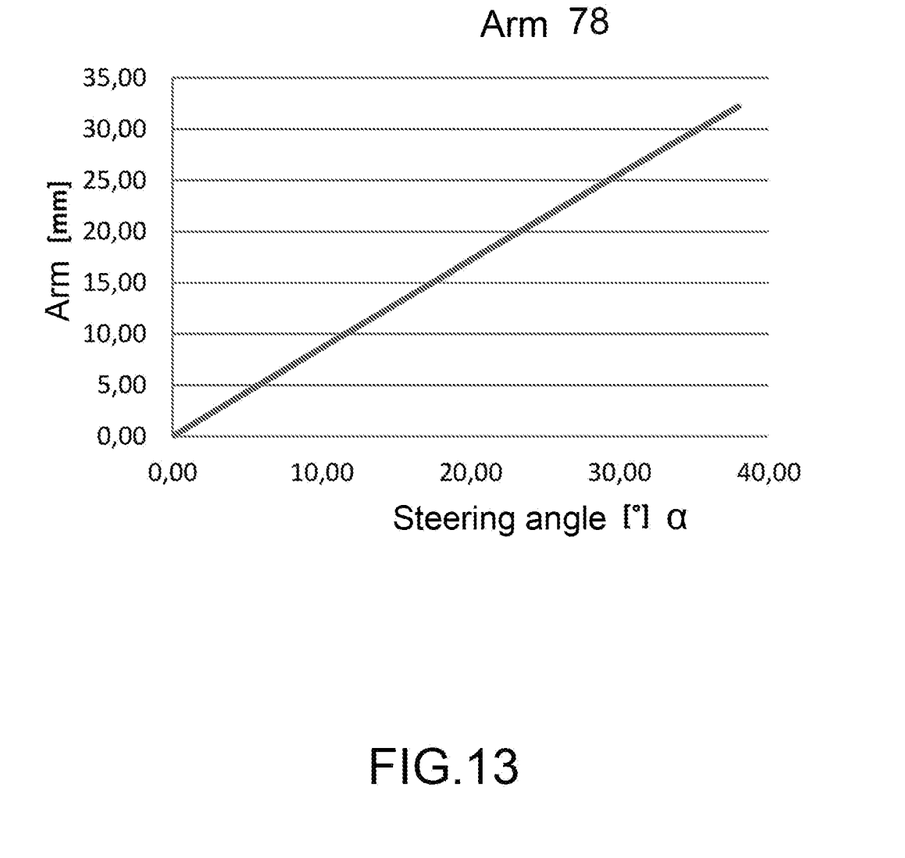
FIG. 13 consists of a graph depicting the trend of an arm of the force exerted by the elastic return means with respect to the steering axis as a function of the steering angle, according to an embodiment of the present invention.

FIG. 13 shows the trend of the arm of the force expressed by the spring with respect to the steering axis X-X (on the ordinate) as a function of the steering angle imposed by the user (on the abscissa). A construction of this arm is clearly illustrated in FIG. 10, in which a geometric construction is shown, on a plane P orthogonal to the steering axis X-X, comprising the attachment points 48,52, the steering axis X-X, the steering angle ∝, the arm 78, as well as the initial interaxial spacing 72 (i.e., with the steering in c), and the final interaxial spacing 80, i.e., the interaxial spacing or distance between said attachment points 48,52 following the rotation of the steering axis X-X equal to a steering angle oc.

Figure 9B:
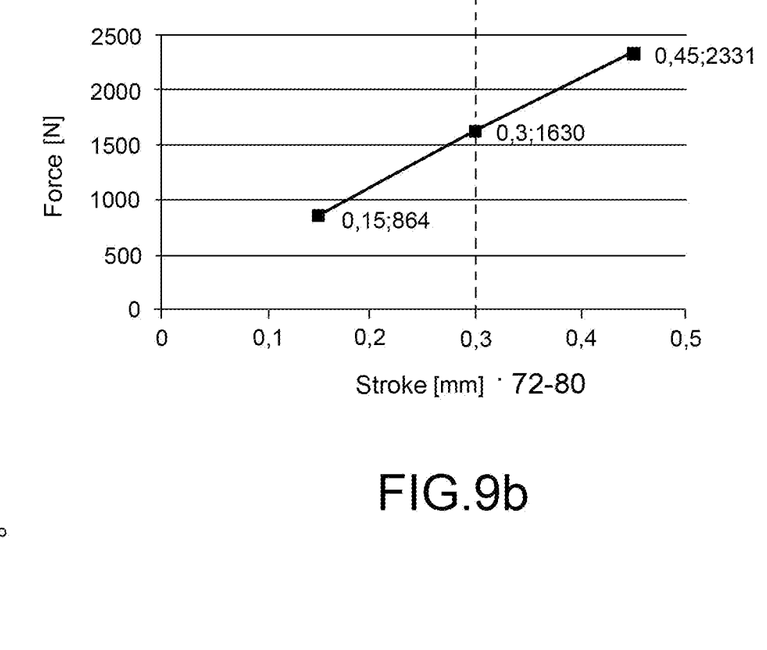
FIG. 9b is a force/displacement diagram, respectively in ordinates and in abscissae, of a regressive trend Belleville spring according to the present invention.

A trend of the force expressed by the Belleville spring as a function of its compression is expressed, as seen, in FIG. 9b. From the composition of the cited trends, one obtains the graph of FIG. 11 relative to the elastic return torque provided by the elastic return means 44 to the steering shaft 24.

Figure 11:
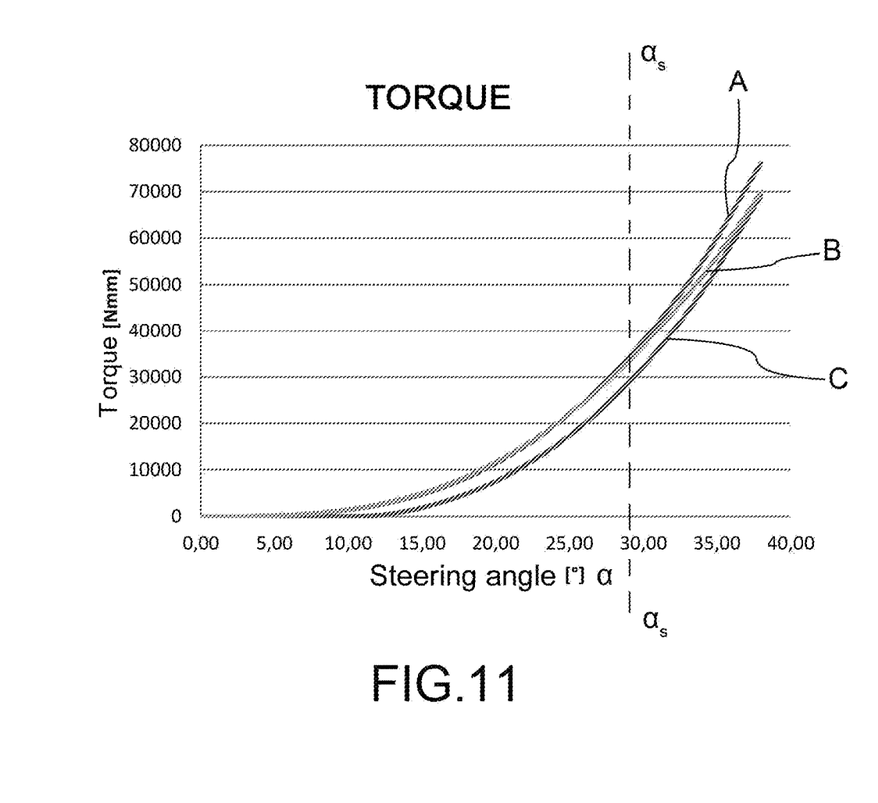
FIG. 11 consists of graphs depicting the trend of an elastic return torque as a function of a steering angle, exerted by elastic return means according to an embodiment of the present invention.

As one can see, FIG. 11 shows three different curves A,B,C, related to distinct trends of elastic return torque on the steering shaft, obtainable with different return springs, as a function of different steering angles (on the abscissa).

In particular, curve A represents the elastic return torque obtainable with the use of a first linear spring having a first stiffness K1, and the curve C represents the elastic return torque obtainable with the use of a second linear spring having a second stiffness K2, with K1>K2.

Therefore, the curve B represents an example of an elastic return torque according to this invention, which is able to mediate the behavior obtainable by the use of a linear spring of stiffness greater than K1, in a section lower than a threshold angle $\alpha_s$, and with the use of a linear spring of stiffness less than K2, after having exceeded said threshold angle $\alpha_s$.

From graph B, one can see that the trend of the torque as a function of the steering angle is initially progressive, that is, the slope of the torque/steering angle curve increases with the increase of the steering angle. Then, after reaching said threshold value cc, the slope of the torque/steering angle curve increases less with respect to the lower steering angles, thus becoming 'less' progressive.

As may be appreciated from the description, the steering group according to the invention allows the drawbacks presented in the prior art to be overcome.

In particular, the use of one or more regressive springs allows having an efficient mechanism from the lowest steering angles without excessively hardening the steering even at higher steering angles.

In other words, the mechanism is always effective and never invasive or perceived as such by the user.

Moreover, the mechanism allows countering the phenomenon of steering lock also by employing front axles with high trail, for example due to a large diameter wheel, for example of 21 inches, and angles of incidence even greater than 40 degrees.

Moreover, this invention does not require the use of steering plates to reduce the trail or to center the weight of the fairing on the steering axis. In this way, the designers do not encounter particular aesthetic or design constraints for the manufacture of motor vehicles even with 'critical' trail values.

The same applies to the size and the weight of the fairing that, due to this invention, presents no particular manufacturing constraints. In this way, it is also possible to produce fairings that also support headlamps of large dimensions and weight, since a suitable calibration of the elastic means allows counterbalancing the locking effect of the steering that would ensue.

Therefore, due to this invention, the dimensional, aesthetic and structural constraints currently presented by the front axles of motor vehicles of the known solutions have been overcome. Therefore, designers may freely make broad adjustments of the parameters of the front axle such as the incidence of the steering tube, the weight, the size and the fastening of the fairing and its components such as for example the headlamp, the steering plates, the diameter of the wheels, the adjustments of the front suspension, the opening of the front handlebar and the like.

The use of Belleville springs allows the development of high elastic return forces even with small compression strokes.

In addition, the mechanism is not very bulky and not very visible from the outside so as not to impact the aesthetics of the front axle of the motor vehicle.

Finally, the system is lightweight and inexpensive to manufacture and assemble.

A person skilled in the art, in order to satisfy contingent and specific needs, may make numerous modifications and variations to the steering groups described above, all however contained within the scope of the invention as defined by the following claims.

The invention claimed is:
1. Steering group of a motor vehicle comprising:
a front frame fitted with a steering tube rotatably housing a steering shaft or pin, which rotates around a steering axis,
the front frame being fitted with an upright integral with said steering tube,
the front frame comprising a steering bracket, joined in rotation with the steering shaft, and
elastic return means which elastically influence the steering shaft to position itself centrally with respect to the front frame, said elastic return means being placed and mechanically connected between the upright and the steering bracket in order to exert an elastic return action when the steering shaft rotates with respect to said central symmetrical position,
wherein said elastic return means have a regressive trend elastic response, wherein the stiffness of the elastic return means decreases as the displacement of the steering shaft from said central position increases,
wherein said elastic return means comprise a first attachment point of the elastic return means to the steering bracket and a second attachment point to an upright of the elastic return means,
wherein the elastic return means comprise a sheath and a piston provided with a stem sliding with respect to a seat delimited by said sheath, the piston and the sheath being each integral with one of said attachment points and wherein between the stem and the seat at least one spring is interposed so that the center-to-center distance or distance between the attachment points is variable as a function of the compression of said spring,
wherein the sheath creates an outer casing of closure and stiffening for the elastic return means.
2. Steering group according to claim 1, wherein the sheath comprises a first cup-shaped portion and a second cup-shaped portion that realize an outer casing of closure and stiffening for the elastic return means.
3. Steering group according to claim 2, wherein said first and second cup-shaped portion are axisymmetric, in particular cylindrical, with respect to a prevalent direction of extension of the elastic return means.
4. Steering group according to claim 3, wherein a diameter of the first cup-shaped portion is smaller than a diameter of the second cup-shaped portion, at least one of the diameters being dimensioned so as to accommodate with clearance an end portion of said stem.
5. Steering group according to claim 4, wherein said clearance houses at least one sliding bushing that facilitates the relative sliding between the end portion of the stem and the first cup-shaped portion.
6. Steering group according to claim 2, wherein, in correspondence of a passage portion between the first and second cup-shaped portion is identified a first shoulder that defines a first axial abutment for the spring.
7. Steering group according to claim 6, wherein the piston comprises a second shoulder, axially opposite the first shoulder, said first and second shoulder defining respective ends of stroke of the spring along a prevalent direction of extension of the elastic return means.
8. Steering group according to claim 2, wherein the second cup-shaped portion terminates with a locking end that engages in a closing cap, from the side of the first attachment point integral to the stem.
9. Steering group according to claim 8, wherein the closing cap accommodates the stem with clearance so as to allow the sliding of the stem with respect to the same closing cap.
10. Steering group according to claim 8, wherein the closing cap is provided with a dust cover or seal that slides on the stem so as to prevent the entry of dust and dirt inside the sheath.
11. Steering group according to claim 1, wherein said elastic return means have a zero preload, so as not to exert any elastic action around the central symmetrical position of the steering shaft.
12. Steering group according to claim 1, wherein said elastic return means are placed between the upright and the steering bracket so as to be pulled when the steering shaft rotates with respect to said central symmetrical position, wherein said elastic return means have a regressive trend elastic response.
13. Steering group according to claim 10, wherein said elastic return means are placed between the upright and the steering bracket so as to be compressed when the steering shaft rotates with respect to said central symmetrical position, wherein such elastic return means have a regressive trend elastic response, wherein the stiffness of the elastic return means decreases as the compression of said elastic return means increases.
14. Steering unit according to claim 1, wherein a first attachment point of the elastic return means to the steering bracket is positioned in front of the steering axis, in a forward direction relative to a plane P orthogonal to the steering axis and parallel to a lower surface of said steering bracket, and wherein a second attachment point to the upright of the elastic return means is positioned behind the steering axis with respect to said forward direction on the plane.
15. Steering group according to claim 14, wherein said attachment points are aligned with respect to the centerline plane of the front frame, placed parallel to a straight direction, so as to have a symmetrical behavior of the elastic return means in steering to the left and to the right with respect to the symmetrical central position of the steering shaft.
16. Steering group according to claim 14, where said attachment points of the elastic return means comprise cylindrical joints which allow respective rotations of the elastic return means around the rotation axes parallel to said steering axis.
17. Steering group according to claim 1 wherein said elastic return means comprise at least one regressive trend spring.
18. Steering group according to claim 17, wherein said at least one spring is a Belleville spring.
19. Steering group according to claim 1 wherein the elastic return means comprise a plurality of regressive trend Belleville springs, positioned in series.

20. Steering group according to claim 19, wherein said Belleville springs in series are placed in direct contact with each other.

21. Steering group according to claim 18, wherein said Belleville springs are provided for in a number between 15 and 30 in series with each other.

22. Steering group according to claim 18, wherein said Belleville springs are the same as each other.

23. Steering group according to claim 18, wherein the Belleville springs are sized so as to have $1.8<De/Di<2.4$, where De is equal to an outer diameter of the Belleville spring and Di is equal to an inner diameter of the Belleville spring.

24. Steering group according to claim 18, wherein the Belleville springs are sized so as to have $18<De/t<28$, where De is equal to an outer diameter of the Belleville spring and t is equal to a thickness of the Belleville spring.

25. Steering group according to claim 18, wherein the Belleville springs are sized so as to have $0.4<h0/t<0.75$, where h0 is equal to the rest height of the Belleville spring and t is equal to a thickness of the Belleville spring.

26. Motor vehicle comprising a steering group according to claim 1.

* * * * *